US 6,731,601 B1

(12) United States Patent
Krishna et al.

(10) Patent No.: US 6,731,601 B1
(45) Date of Patent: *May 4, 2004

(54) APPARATUS AND METHOD FOR RESETTING A RETRY COUNTER IN A NETWORK SWITCH PORT IN RESPONSE TO EXERTING BACKPRESSURE

(75) Inventors: Gopal Krishna, San Jose, CA (US); Ching Yu, Santa Clara, CA (US); Peter Chow, San Jose, CA (US); Jenny Liu Fischer, Moutain View, CA (US); Bahadir Erimli, Campbell, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/477,723

(22) Filed: Jan. 5, 2000

Related U.S. Application Data

(60) Provisional application No. 60/152,947, filed on Sep. 9, 1999.

(51) Int. Cl.$^7$ .................................................. G01R 31/08
(52) U.S. Cl. ........................................ 370/230; 370/235
(58) Field of Search ................................ 340/412, 413, 340/414, 415, 416, 417, 419, 235, 236, 249, 252, 445, 447, 448, 462, 458, 459, 230

(56) References Cited

U.S. PATENT DOCUMENTS

5,515,376 A    5/1996   Murthy et al.

*Primary Examiner*—Hassan Kizou
*Assistant Examiner*—Timothy Lee (57) ABSTRACT

A network switch having switch ports for communication of data packets with respective computer network nodes according to CSMA/CD protocol that resets a retry counter within any one of the respective switch ports if backpressure is asserted by that port. The resetting of the retry counter within a port after assertion of backpressure affords the port a greater probability of winning collision mediation under the CSMA/CD protocol, thus more quickly relieving congestion which may occur in the network switch.

20 Claims, 9 Drawing Sheets

APPARATUS AND METHOD FOR RESETTING A RETRY COUNTER IN A NETWORK SWITCH PORT IN RESPONSE TO EXERTING BACKPRESSURE

PRIORITY

This application claims priority to provisional application Serial No. 60/152,947, filed Sep. 9, 1999.

RELATED APPLICATIONS

This application contains subject matter similar to that disclosed in application Ser. No. 09/316,185 filed May 21, 1999, entitled APPARATUS AND METHOD FOR MODIFYING A LIMIT OF A RETRY COUNTER IN A NETWORK SWITCH PORT IN RESPONSE TO EXERTING BACKPRESSURE and application Ser. No. 09/316,184 filed May 21, 1999, entitled APPARATUS AND METHOD FOR PROGRAMMABLY MODIFYING A LIMIT OF A RETRY COUNTER IN A NETWORK SWITCH PORT IN RESPONSE TO EXERTING BACKPRESSURE.

BACKGROUND

1. Field of Invention

The present invention relates to computer network interfacing and switching and, more particularly, to an apparatus and method controlling a network switch port operating in a half-duplex mode.

2. Background Art

Local area networks use a network cable or other media to link stations on a network. Each local area network architecture uses a media access control (MAC) enabling network interfaces at each station to share access to a medium The Ethernet protocol (IEEE/ANSI Std. 802.3) defines a half-duplex media access format that permits all stations to access the network media channel with equality. Traffic is not distinguished or prioritized over the media. Each station includes an Ethernet interface that uses carrier-sense multiple-access with collision detection (CSMA/CD) to listen for traffic on the media. Any station can attempt to contend for the channel by waiting a predetermined transmission delay interval after the deassertion of the receive carrier on the media, known as the interpacket gap (IPG) interval. If a plurality of stations have data to send on the network, each of the stations will attempt to transmit in response to the sensed deassertion of the receive carrier on the media and after the IPG interval, resulting in a collision. Hence, a transmitting station will monitor the media to determine if there has been a collision due to another station sending data at the same time. If a collision is detected, both stations stop, wait a respective random amount of time, and retry transmission.

Ethernet networks mediate collisions by using a truncated binary exponential backoff (TBEB) algorithm, that provides a controlled pseudo-random mechanism to enforce a collision backoff interval before retransmission is attempted. According to the truncated binary exponential backoff algorithm, a station counts the number of transmission attempts (k) during the transmission of a current frame using a counter, referred to as a "retry counter". The station computes a collision backoff interval as a randomized integer multiple of a slot time interval, and attempts retransmission after the collision backoff interval. The station will attempt to transmit under the truncated binary exponential algorithm until a retry limit value has been reached. Under the Ethernet standard (IEEE/ANSI Std. 802.3), the limit for attempting transmission of a particular data frame is sixteen (16) times. If the station unsuccessfully attempts transmission of a data frame sixteen times, the data frame is then discarded by the station.

The collision backoff interval is calculated by selecting a random number of time slots from the range of zero to $2_k$. For example, if the number of attempts is k=3, then the range of randomly selected integer multiples is (0,8); if the randomly-selected integer multiple is four, then the collision backoff interval will be equal to four slot time intervals. According to Ethernet protocol, the maximum range of randomly selected time slots is from zero to $2^{10}$.

The truncated binary exponential algorithm has the disadvantage that the range of randomly selected integer multiples $(0, 2^k)$ increases exponentially each time a specific station unsuccessfully attempts a retry transmission after collision (i.e., the count k is increased), resulting in a higher probability that during the next collision mediation the station will randomly select a larger integer multiple of time slots, thereby decreasing the probability that the station will gain access to the media on the next retry transmission. Thus, a new station that has data to transmit has a higher probability of gaining access to the media than the station having a greater number of attempts. This effect is known as the "capture" effect, where a new station in the collision mediation effectively has a greater probability of capturing access to the media than the losing station until the maximum number of attempts (i.e., maximum retry limit value) has been reached.

Hence, collision mediation may reduce the network throughput and create packet access latencies. Consequently, the capture effect causes a large variance in the network access latency, and a corresponding large variance in end to end delays experienced by data packets.

Additionally, network stations generally do not have knowledge of the status of other stations on the network. If there is no collision, a transmitting station will transmit the data packet regardless of the state of the receiving station. If the receiving station is in a state of congestion, for example due to a lack of buffer space, the receiving station will discard the transmitted packet, resulting in a loss of data. If upper layer protocol requires the data to be resent, the sending station will resend the data packet at a later time, reducing the network throughput and efficiency.

Network congestion occurs if a receiving network element is unable to receive data at a rate greater than or equal to the transmission rate of the transmitting element. For example, traffic in a client-server environment is dominated by client requests followed by a burst of frames from the server to the requesting client. Although the full duplex environment enables the server to transmit packets while receiving requests from other clients, only a limited number of client requests can be output to the server from the switched hub at the assigned switching port. If the number of client requests exceeds the capacity of the server's buffer, some of the data packets will be lost. Alternatively, a client having limited buffer space may be unable to keep up with the transmission rate of the server, resulting in lost packets.

Flow control has been proposed to reduce network congestion, where a receiving station causes a sending station to temporarily suspend transmission of data packets. A proposed flow control arrangement for a half duplex environment, referred to as "backpressure", directs a receiving station to force a collision with the transmitting station by transmitting a jamming sequence of bits when the receive buffer of the receiving station reaches a "receive buffer unavailable" state. This state occurs when the receive buffer of the receiving station is queuing data packets at a rate exceeding the rate at which the buffer is capable of subsequently emptying to another station receiving the data packets (i.e., transmitting).

Figure 7:
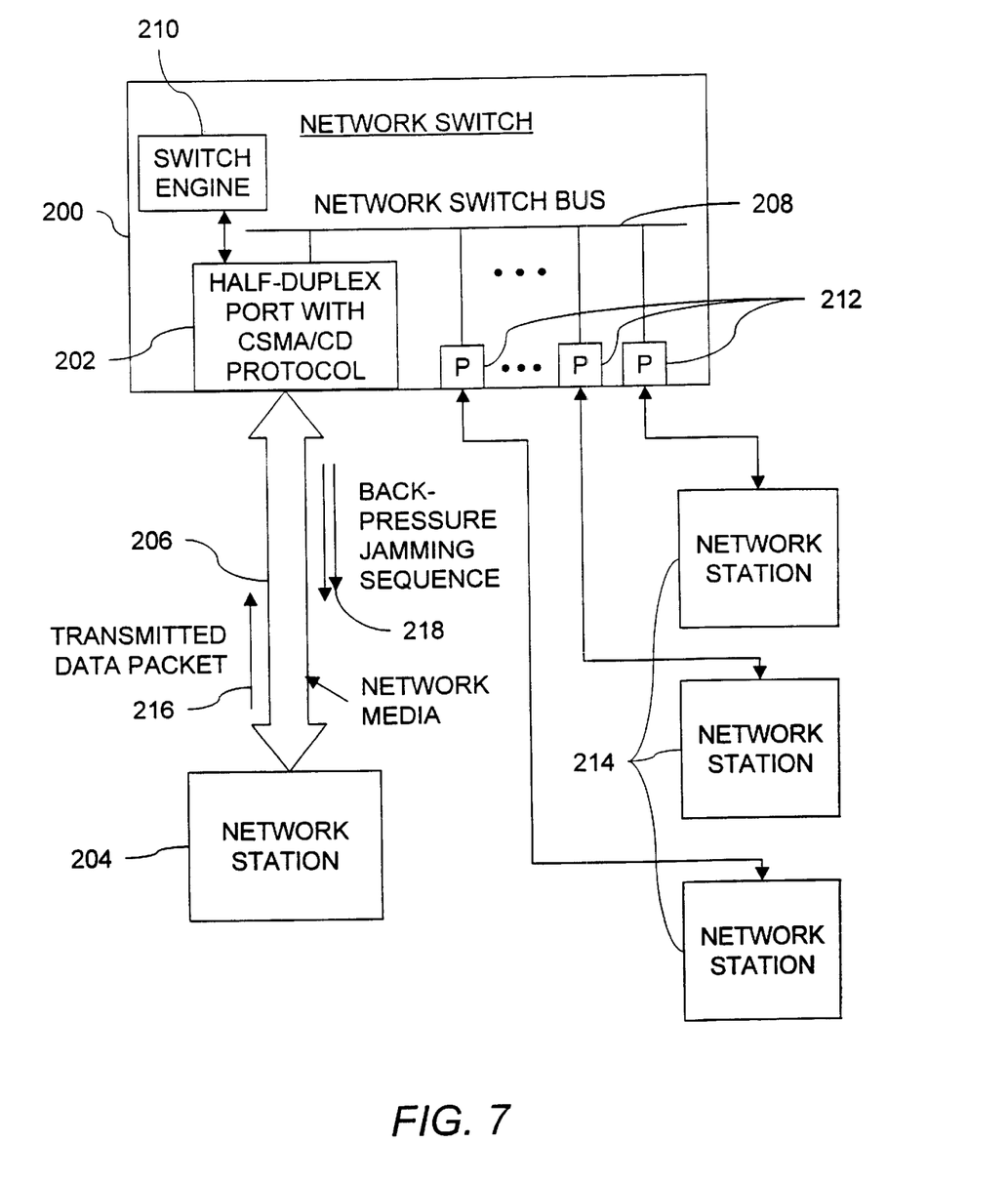
FIG. 7 is block diagram illustrating the use of backpressure signalling in a network switching system.

FIG. 7 illustrates the use of backpressure by a port 202 within a network switch 200 operating in half-duplex mode according to the CSMA/CD protocol. Port 202 receives and transmits data packets in communication with a network station 204 via a network media 206. If the port 202 is unsuccessful in transferring a data packet from its transmit buffer to the network station 204 over the media 206 due to collisions, the port 202 will backoff and wait a randomly selected period of time before retransmitting according to the CSMA/CD protocol. After each transmission attempt, the retry counter within the port is incremented. As discussed previously, as the number of retrys attempted by the transmitting port increases, the likelihood of that port winning collision mediation decreases.

Additionally, during the backoff interval, the receive buffers in port 202 may become active and start to receive a data packet 216 transmitted from network station 204. Should the receive buffers in the port 202 become overloaded due to congestion of the network switch bus 208 or other network switch ports 212, for example, the network switch engine 210 detects that the receive buffers of port 202 have become overloaded and directs the port to assert a backpressure jamming sequence 218, causing network station 204 to backoff and wait a randomly selected period of time before attempting retransmission. Under the CSMA/CD protocol, the collision forced by the jamming sequence causes the transmitting network station 204 to abort, jam and retransmit a data packet after the collision backoff interval. Thus, the asserted "backpressure" controls the input port congestion of station 202 by forcing the sending network station 204 to invoke the truncated binary exponential backoff (TBEB) algorithm under the CSMA/CD protocol. Consequently, the TBEB algorithm causes the sending station 204 to stop transmission and wait to retransmit when the collision backoff interval is complete. During the backoff interval, the congested port 202 is given time to unload its internal receive buffers. If the port 202 remains congested, additional backpressure is asserted onto network station 204 to attempt to further alleviate the port congestion.

Conditions giving rise to the assertion of backpressure by a port 202, such as congestion within the switch 200 and other ports 212 can cause degradation of the switch performance. In addition, a higher retry count value in ports asserting backpressure can lead to further performance degradation since these ports are less likely to win collision mediation. Hence, data packets awaiting retransmission remain in the transmit buffers for longer periods of time due to lost collision mediation, thereby aggravating the congestion in the switch.

SUMMARY

There is a need for an apparatus and method for controlling a network switch port that provides the port a greater probability of winning collision mediation following the assertion of backpressure by that port.

This and other needs are attained by the present invention, where the retry counter of a network switch port is reset upon assertion of backpressure by the port.

According to one aspect of the invention, a network switch in a computer network includes a plurality of ports configured for transferring data packets over the computer network. Each respective port of the plurality of ports has a retry counter that counts the number of times the respective port attempts and fails to transfer a data packet over the computer network. Furthermore, each network switch port includes a retry counter reset for resetting the count of the retry counter to a start value when a backpressure data sequence is asserted by the respective port onto the computer network. The retry counter reset affords each of the ports within the network switch a greater probability of winning collision mediation when the ports are attempting to transmit a data packet after backpressure assertion. In turn, the probability for quickly transmitting data packets from the network switch ports is increased, alleviating congestion in the network switch.

According to another aspect of the invention, a method for controlling a port of a network switch in a computer network includes incrementing the count in a retry counter within the port each time the port attempts and fails to transfer a data packet over the computer network. In addition, the method includes sensing whether a backpressure sequence of bits is asserted by the port over the computer network. If assertion of backpressure is sensed, the count in the retry counter is reset to a start value. Resetting the retry counter affords the port a greater probability of winning collision mediation when the port is attempting to transmit a data packet after the assertion of backpressure. A reset retry counter is advantageous because the probability for quickly transmitting data packets from the network switch ports is increased, thus helping to alleviate congestion in the switch.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

DESCRIPTION OF THE PREFERRED EMBODIMENTS

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
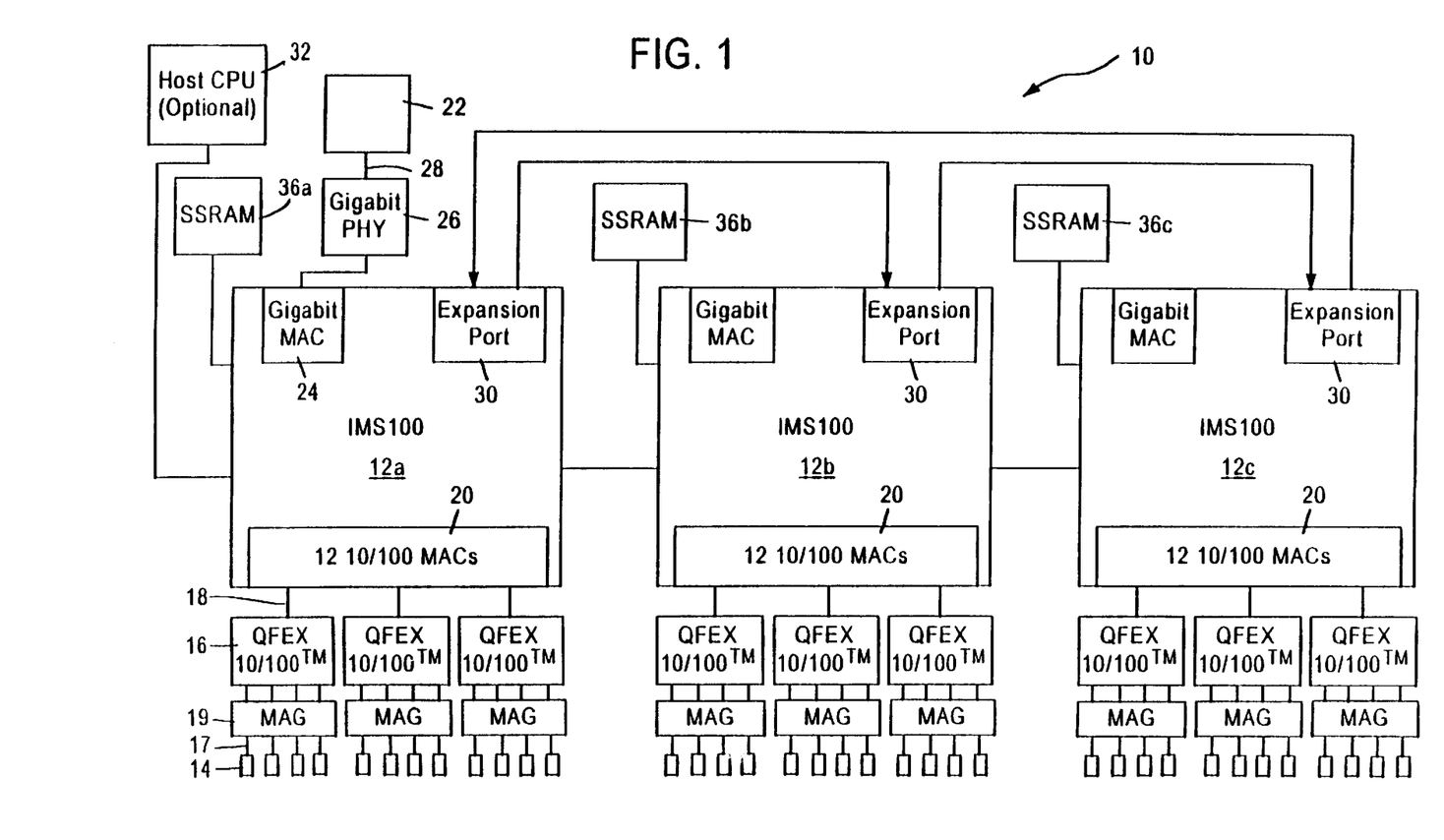
FIG. 1 is a block diagram of a packet switched network including multiple port switches according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the switches 12 selectively forward data packets received from the network nodes 14 or 22 to the appropriate destination based upon Ethernet protocol.

Each switch 12 includes a media access control (MAC) module 20 that transmits and receives data packets to and from 10/100 Mb/s physical layer (PHY) transceivers 16 via respective shared media independent interfaces (MII) 18 according to IEEE 802.3u protocol. Each switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished or prioritized over the medium 17. Rather, each half-duplex station 14 includes an Ethernet interface card that uses carrier-sense multiple access with collision detection (CSMA/CD) to listen for traffic on the media. The absence of network traffic is detected by sensing a deassertion of a receive carrier on the media. Any station 14 having data to send will attempt to access the channel by waiting a predetermined time after the deassertion of a receive carrier on the media, known as the interpacket gap interval (IPG). If a plurality of stations 14 have data to send on the network, each of the stations will attempt to transmit in response to the sensed deassertion of the receive carrier on the media and after the IPG interval, resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding switch 12.

Each switch 12 is coupled to 10/100 physical layer (PHY) transceivers 16 configured for sending and receiving data packets to and from the corresponding switch 12 across a corresponding shared media independent interface (MII) 18. In particular, each 10/100 PHY transceiver 16 is configured for sending and receiving data packets between the switch 12 and up to four (4) network stations 14 via the shared MII 18. A magnetic transformer 19 provides AC coupling between the PHY transceiver 16 and the corresponding network medium 17. Hence, the shared MII 18 operates at a data rate sufficient to enable simultaneous transmission and reception of data packets by each of the network stations 14 to the corresponding PHY transceiver 16.

Each switch 12 also includes an expansion port 30 for transferring data between other switches according to a prescribed protocol. For example, each expansion similar to the port 24, enabling multiple switches 12 to be cascaded together as a separate backbone network.

Figure 2:
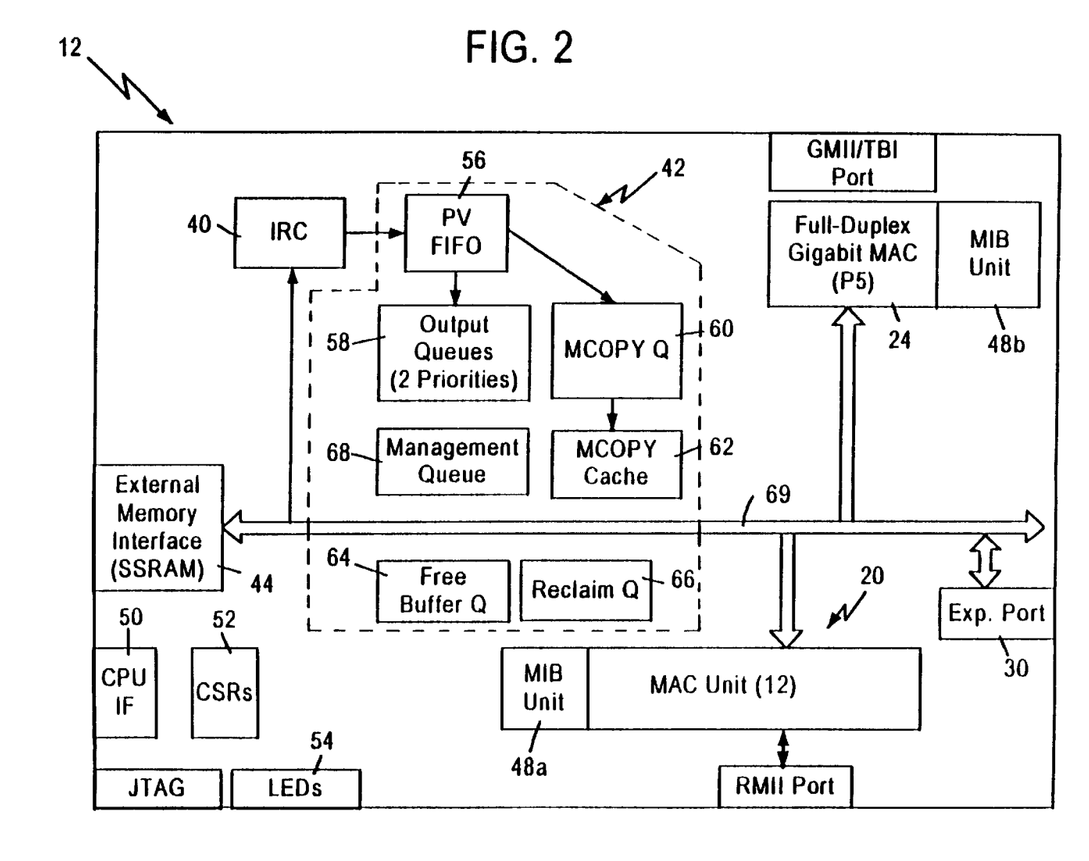
FIG. 2 is a block diagram of the multiple port switch of FIG. 1.

FIG. 2 is a block diagram of the switch 12. The switch 12 contains a decision making engine 40 that performs frame forwarding decisions, a switching subsystem 42 for transferring frame data according to the frame forwarding decisions, a buffer memory interface 44, management information base (MIB) counters 48, and MAC (media access control) protocol interfaces 20 and 24 to support the routing of data packets between the Ethernet (IEEE 802.3) ports serving the network stations 14 and 22. The MIB counters 48 provide statistical network information in the form of management information base (MIB) objects to an external management entity controlled by a host CPU 32, described below.

The external memory interface 44 enables external storage of packet data in a synchronous static random access memory (SSRAM) 36 in order to minimize the chip size of the switch 12. In particular, the switch 12 uses the SSRAM 36 for storage of received frame data, memory structures, and MIB counter information. The memory 36 is preferably a pipelined burst SSRAM having a 64-bit wide data path, a 16-bit wide address path, and a memory size of at least 512 kbytes, capable of running at clock frequencies up to 66 MHz.

The switch 12 also includes a processing interface 50 that enables an external management entity such as a host CPU 32 to control overall operations of the switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received from one source to at least one destination station.

The switch 12 also includes an LED interface 54 that clocks out the status of conditions per port and drives external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the frame pointer value and the associated header information to determine which MAC ports will output the data packet stored at the location specified by the frame pointer. The decision making engine may thus determine that a given data packet should be output by either a single port, multiple ports, or all ports (i.e., broadcast). For example, each data packet includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. Alternatively, the received data packet may include a VLAN (virtual LAN) tagged frame according to IEEE 802.1d protocol that specifies another network (e.g., via a gateway 22) or a prescribed group of stations. The IRC 40 may also determine that the received data packet should be transferred to another switch 12 via the expansion port 30. Hence, the internal rules checker 40 will decide whether a frame temporarily stored in the buffer memory 36 should be output to a single MAC port or multiple MAC ports.

The internal rules checker 40 outputs a forwarding decision to the switch subsystem 42 in the form of a forwarding descriptor. The forwarding descriptor includes a port vector identifying each MAC port that should receive the data packet, priority class identifying whether the frame is high priority or low priority, VLAN information, Rx port number, Opcode, and frame pointer. The port vector identifies the MAC ports to receive the data packet for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data packet transmission. In other words, the port vector FIFO 56 supplies the frame pointer on a per-port basis. The output queues 58 fetch the data packet identified in the port vector from the external memory 36 via the external memory interface 44, and supply the retrieved data packet to the appropriate transmit FIFO of the identified ports. If a data packet is to be supplied to a management agent, the frame pointer is also supplied to a management queue 68, which can be processed by the host CPU 32 via the CPU interface 50.

The multicopy queue 60 and the multicopy cache 62 keep track of the number of copies of the data packet that are fetched from the respective output queues 58, ensuring that the data packet is not overwritten in the SSRAM 36 until the appropriate number of copies of the data packet have been output from the SSRAM 36. Once the number of copies corresponds to the number of ports specified in the port vector FIFO, the port vector is forwarded to the reclaim queue 66. The reclaim queue stores frame pointers that can be reclaimed by the free buffer queue 64 as free pointers. After being returned to the free buffer queue 64, the frame pointer is available for reuse by the MAC unit 20 or the gigabit MAC unit 24.

Figures 3, 3A:
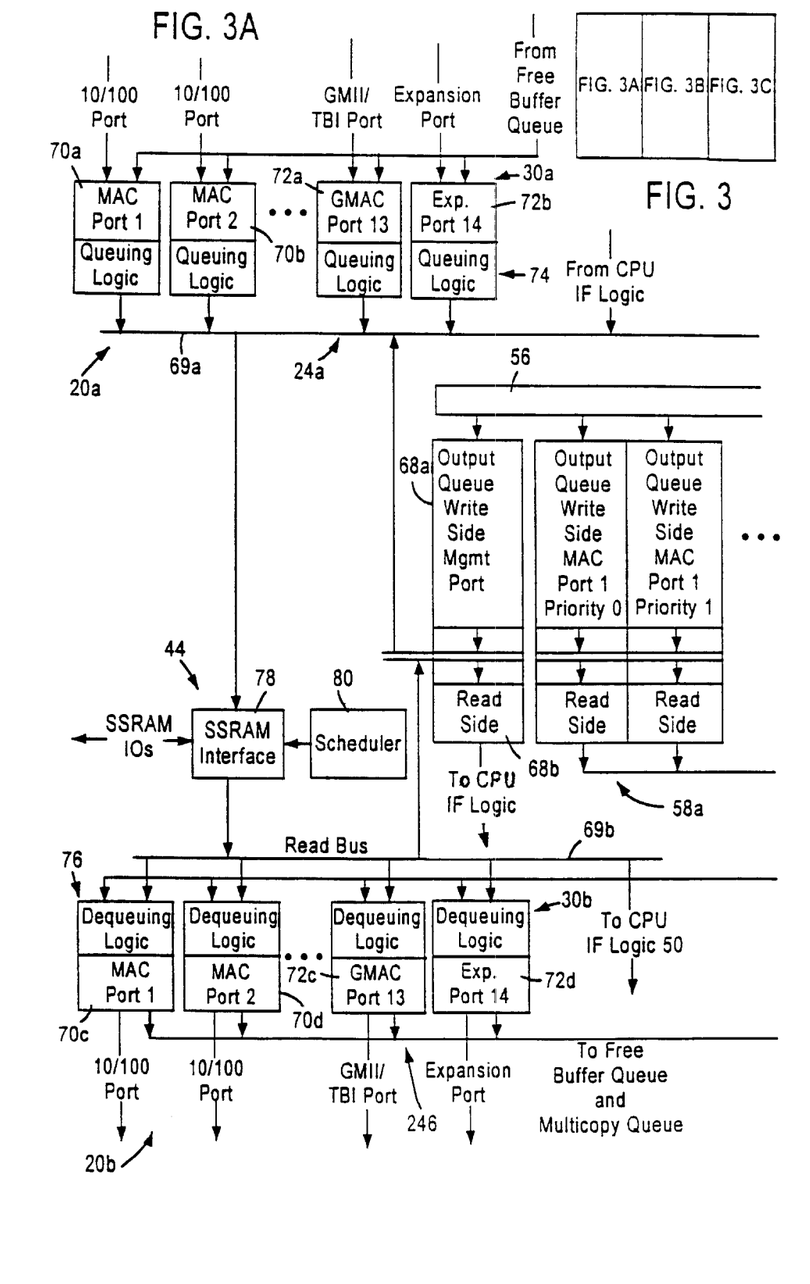
FIG. 3 is a block diagram illustrating in detail the switching subsystem of FIG. 2.
Figure 3B:
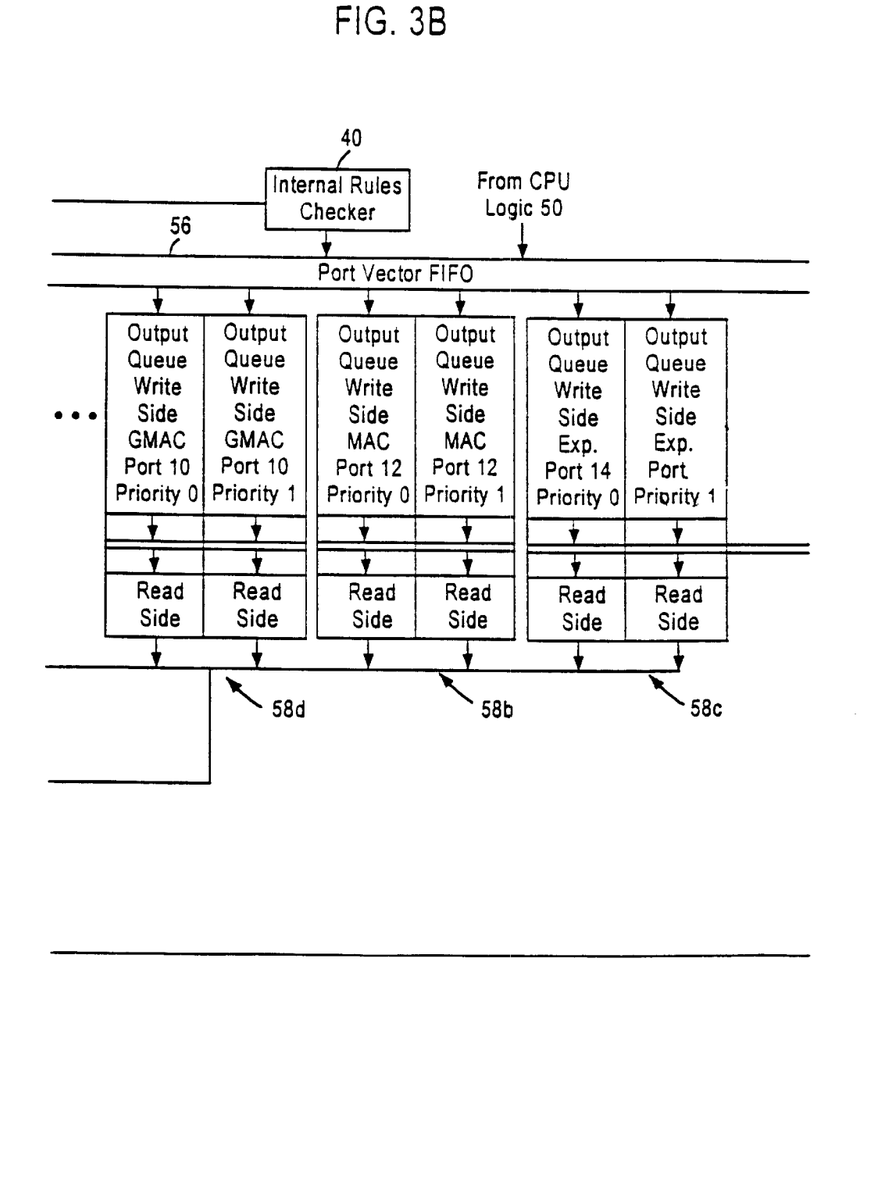
Figure 3C:
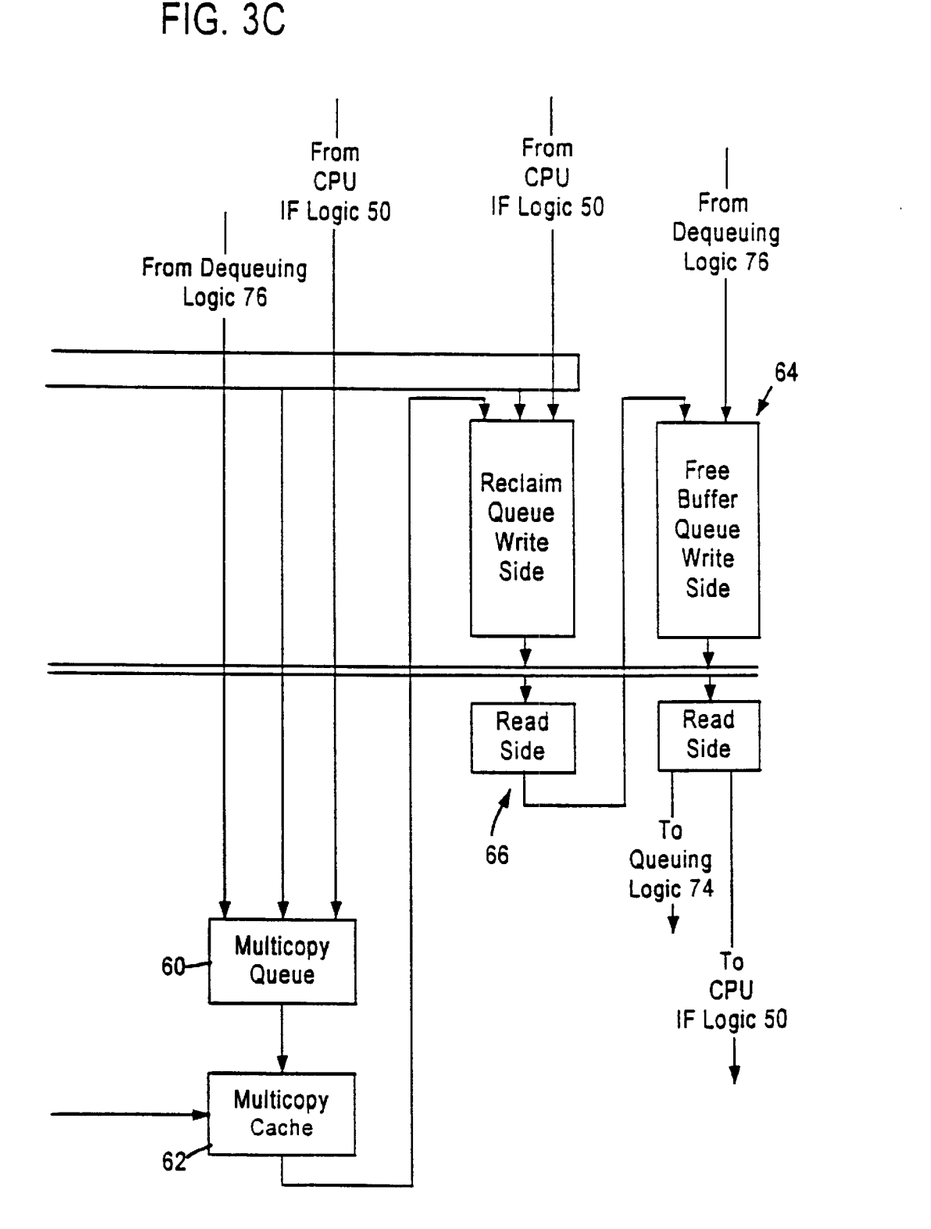

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 20b. The receive portion 20a and the transmit portion 20b each include three (3) quad-MAC enhanced (QMACE) modules 70 configured for performing the corresponding receive or transmit function for four (4) switch ports according to IEEE 802.3 protocol. Hence, QMACE module 70a performs receive MAC operations for 10/100 Mb/s switch ports 0, 1, 2, 3; module 70b performs receive MAC operations for 10/100 Mb/s switch ports 4, 5, 6, 7; and module 70c performs receive MAC operations for 10/100 Mb/s switch ports 8, 9, 10, and 11. The QMACE modules 70d, 70e, and 70f perform the transmit MAC operations for the 10/100 Mb/s switch ports complementary to modules 70a, 70b, and 70c, respectively.

The receive portions 24a and 30a of the gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 70c, 72a, and 72b include queuing logic 74 for transferring of receive data from the corresponding internal receive FIFO to the external memory 36 and the rules checker 40. Each of the transmit MAC modules 70d, 70e, 70f, 72c, and 72d include dequeuing logic 76 for transferring data from the external memory 36 to the corresponding internal transmit FIFO. The queuing logic 74 fetches frame pointers from the free buffer queue 64, and uses the fetched frame pointers to store receive data to the external memory 36 via the external memory interface controller 44. The frame buffer pointer specifies the location in external memory 36 where the received data frame will be stored by the receive FIFO. The queuing logic 74 issues a write request to the external memory interface 44.

The external memory interface 44 includes a scheduler 80 for controlling memory access by the queuing logic 74 or dequeuing logic 76 by any switch port to the external memory 36, and an SSRAM interface 78 for performing the read and write operations with the SSRAM 36. In particular, the switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC 24a stores a data frame in an internal FIFO upon reception from the corresponding switch port. The corresponding queuing logic 74 obtains a frame pointer and sends a write request to the external memory interface 44. The scheduler 80 schedules the write request with other write requests or any read requests from the dequeuing logic 76, and generates a grant for the requesting queuing logic 74 to initiate a transfer at the scheduled event (i.e., slot). The frame data is then transferred over data bus 68a from the receive FIFO to the external memory 36 in a direct memory access (DMA) transaction during the assigned slot. The frame is stored in the location pointed to by the free buffer pointer obtained from the free buffer pool 64, although a number of other buffers may be used to store a frame, as will be described.

The rules checker 40 also receives the frame pointer and the header information (including source address, destination address, VLAN tag information, etc.) by monitoring (i.e., snooping) the DMA write transfer on the bus 68a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue, e.g. at least one of the queues 58 or the mamagement queue 68, should receive the associated frame pointer. The port vector FIFO 56 places the frame pointer into the top of the appropriate queue 58 and/or 68. This queues the transmission of the frame. The output queue 58 is processed separately by the host CPU 32 via the CPU interface 50.

As shown in FIG. 3, each of the transmit MAC units 70d, 70e, 70f, 72d, and 72c have an associated output queue 58a, 58b, 58c, 58d, and 58e, respectively. Each of the output queues 58 have a high priority queue for high priority frame pointers, and a low priority queue for low priority frame pointers. The high priority frame pointers are used for data frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example the output queue 58e for the gigabit transmit MAC 72c. The dequeuing logic 76 for the transmit gigabit port 24b takes the frame pointer from the corresponding gigabit port output queue 58e, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initaite a DMA read during the assigned slot. In response to the grant, the dequeuing logic 76 reads the frame data in a DMA transaction from the location in external memory 36 pointed to by the frame pointer, stores the frame data in the internal transmit FIFO for transmission by the transmit gigabit MAC 72c. If the frame pointer specifies a unicopy transmission, the frame pointer is returned to the free buffer queue 64 following writing the frame data into the transmit FIFO.

A multicopy transmission is similar to the unicopy transmission, except that the port vector has multiple bits set, designating the multiple ports from which the frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the frame has been transmitted to its designated output port(s). In particular, the dequeuing logic passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO also copies the frame pointer and the copy count to the multicopy queue 60. The multicopy queue writes the copy count to the multicopy cache 62. The multicopy cache is a random access memory having a single copy count for each buffer in external memory (i.e., each frame pointer).

Once the dequeuing logic 76 retrieves the frame data for a particular output port based on a fetched frame pointer and stores the frame data in the transmit FIFO, the dequeuing logic checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list chain of frame pointers to identify the entire stored data frame. The reeclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the multiport switch 12 will now be provided. First, the configuration of an exemplary port MAC will be discussed, followed by the details for performing reset of the retry counter within the port MAC.

Retry Counter Reset

Figure 4:
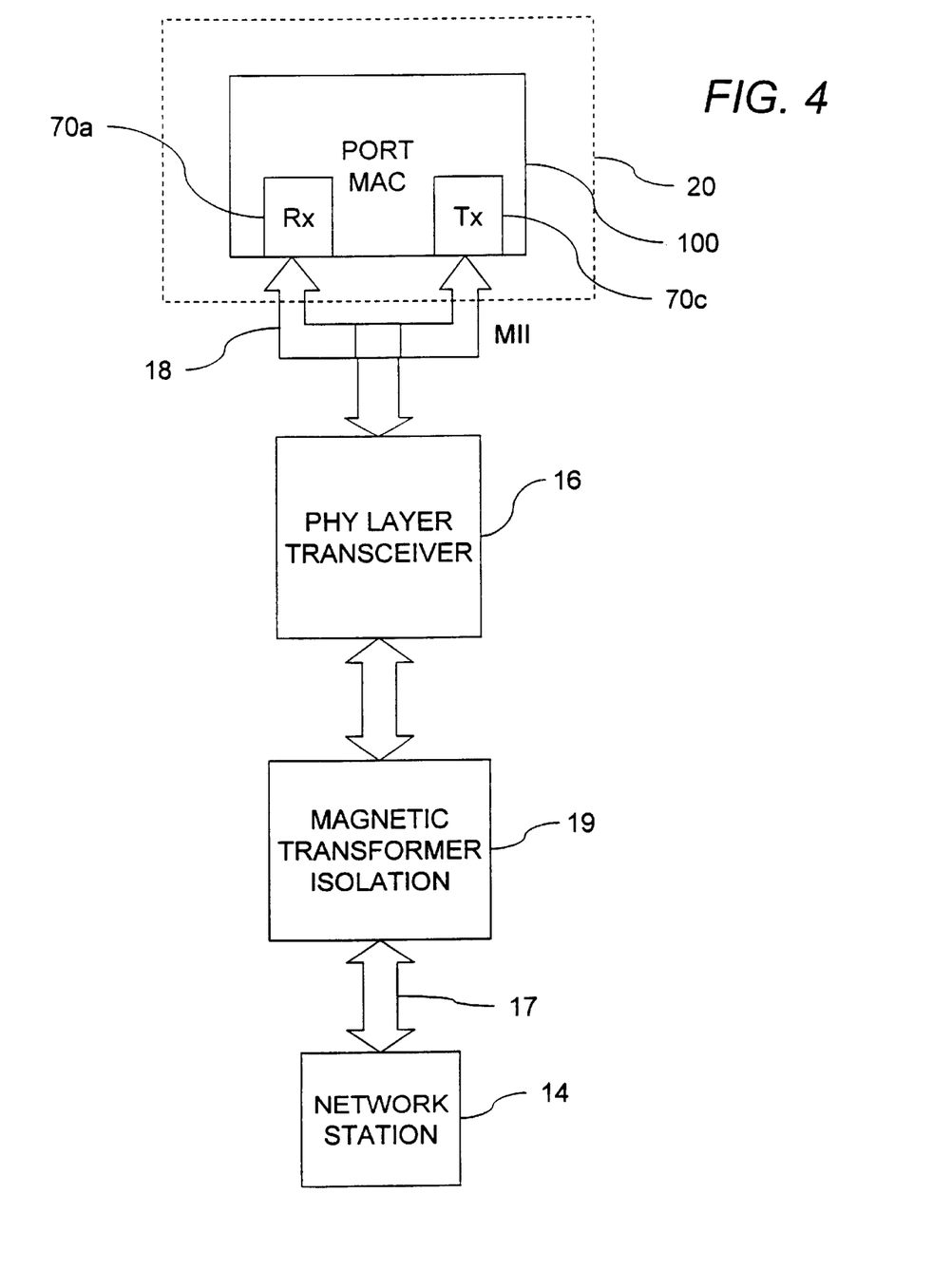
FIG. 4 is a block diagram of a single port system according to an embodiment of the present invention.

FIG. 4 illustrates the configuration of a single port within network switch 12. The MAC unit 20 includes a single port MAC module 100 including the MAC receive portion 70a and the MAC transmit portion 70c. MAC receive portion 70a and MAC transmit portion 70c are connected to the MII 18 which interfaces with the physical layer transceiver 16. A magnetic isolation transformer 19 electrically isolates the physical layer transceiver 16 from the Ethernet medium 17 which connects the port MAC module 100 to a network station 14.

Figure 5:
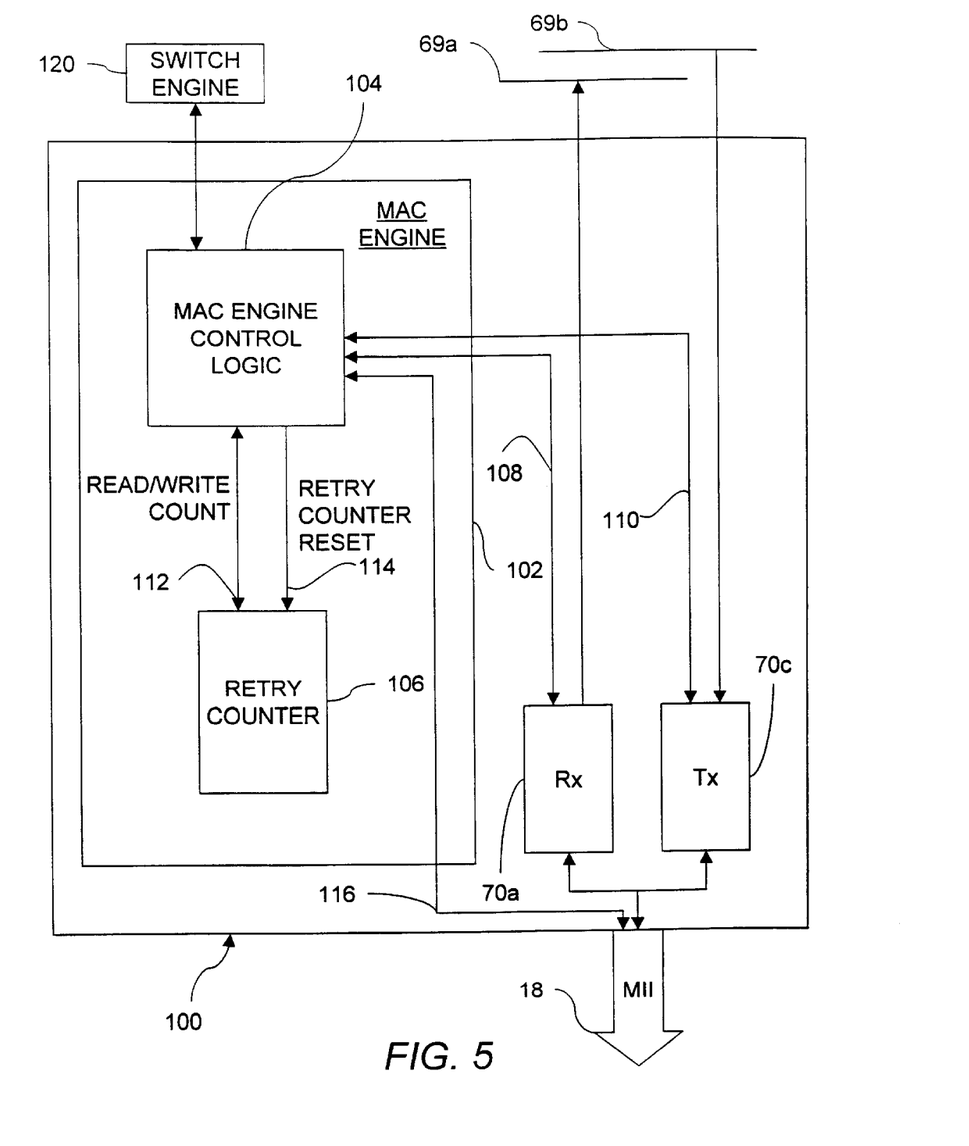
FIG. 5 is a block diagram illustrating in detail the port MAC of FIG. 4.

FIG. 5 illustrates the port module 100 in more detail according to an exemplary embodiment of the present invention. Other elements of the network switch 12 illustrated in FIGS. 2 through 4 are reproduced in FIG. 5 to illustrate the connections of the port module 100 to these other elements.

As shown in FIG. 5, the port MAC module 100 includes a MAC engine 102 controlling the operation of the port MAC module 100. Included within the MAC engine 102 is MAC engine control logic 104 in communication with the switch engine 120. As an example, the switch engine 120 may comprise the host CPU 32 communicating to the MAC engine control logic 104 via the CPU IF 50 and the internal rules checker 40. In addition, the MAC engine 102 includes a retry counter 106 that counts the number of data packet transmission attempts by the transmit portion 70c of the port MAC module 100. The MAC engine control logic 104 is in communication with the receive portion 70a and the transmit portion 70c via connection lines 108 and 110, respectively. Communication with the receive and transmit portions (70a & 70c) enables the control logic 104 to determine when the transmit portion 70c is attempting to transmit a data packet and whether the transmission attempt is successful or not, direct the transmit portion 70c to discard a data packet when the retry counter 106 has reached a maximum number (e.g. 16), and determine if the receive portion 70a is in a state of congestion. Additionally, the MAC engine control logic 104 receives instructions from the switch engine 120 to initiate functions such as the assertion of backpressure by the transmit portion 70c of the port MAC module 100.

The MAC engine control logic 104 also generates a reset signal and transmits it via link 114 for resetting the retry counter 106. In addition, link 112 is used to increment the retry counter 106 each time the transmit portion 70c attempts and fails to transmit a data packet. Further, the MAC engine control logic 104 reads the value of the retry counter 106 via link 112 to determine whether the maximum value of 16 transmission attempts has been achieved.

Figure 6:
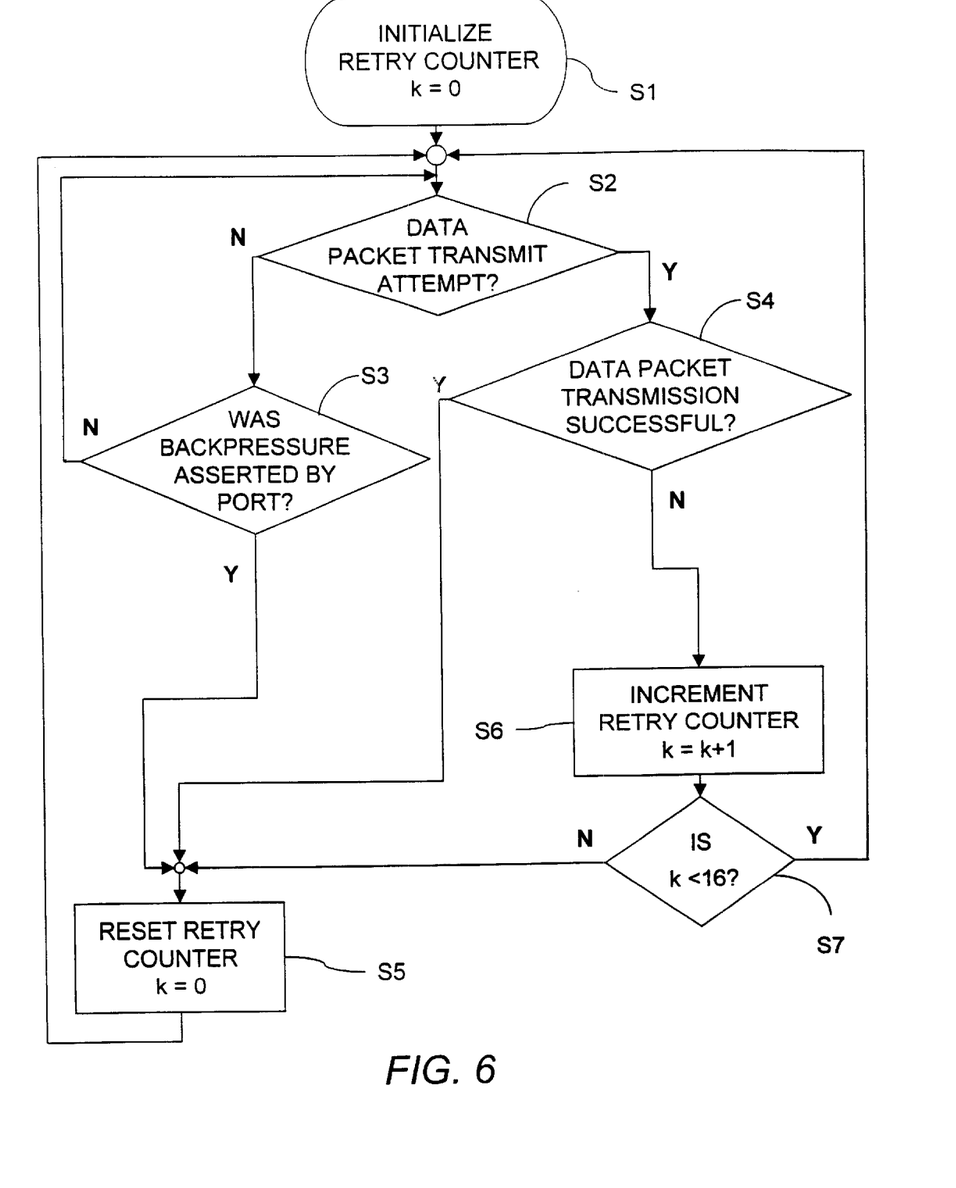
FIG. 6 is a flow diagram of the MAC engine control logic according to an embodiment of the present invention.

FIG. 6 illustrates a flow diagram of the method followed by the MAC engine control logic 104 according to an exemplary embodiment of the present invention. In step S1, the MAC engine control logic 104 initializes the retry counter 106 to a count value of k=0. At step S2, the control logic 104 senses over link 110 whether a data packet was attempted to be transmitted by transmit portion 70c. If a data packet is not being transmitted the control logic 104 proceeds to step S3 to determine whether backpressure was asserted by the port module 100 (i.e., transmit portion 70c). If backpressure is asserted, flow proceeds to step S5 to reset the retry counter value k to zero and then returns to step S2. In this particular embodiment, the assertion of backpressure can occur when the transmit portion 70c has attempted and failed to transmit a data packet. Upon failure, the MAC engine control logic 104 senses via link 116 that a collision has occurred and initiates the CSMA/CD protocol, directing the transmit portion 70c to backoff a random period of time under the TBEB algorithm. During the backoff interval, the receive portion 70a can become enabled for reception of a data packet. Should the receive portion 70a become congested and its FIFO.

If no backpressure is asserted, as determined in step S3, the process loops back and continues to monitor whether the transmit portion 70c is attempting transfer of a data packet at step S2.

When the transmit portion 70c is attempting to transmit a data packet, as determined at step S2, the MAC engine control logic 104 then determines whether the transmission of the data packet is successful in step S4. If the transmission is successful, the flow proceeds to step S5 and the MAC engine control logic 104 resets the retry counter 106 to a value of 0 via link 114.

If transmission of the data packet was unsuccessful, as determined in step S4, the MAC engine control logic 104 proceeds to increment the retry counter by an integer value of 1 via link 112, as indicated at step S6. If the maximum value of 16 has not been reached, the flow proceeds back to step S2, as shown in step S7. Alternatively, if the MAC engine control logic 104 determines that the maximum value 16 has been reached in the retry counter 106, the data packet in the transmit portion 70c is discarded and the control logic 104 resets the retry counter to a value of 0 at step S5 and proceeds back to step S2.

As discussed previously, if backpressure is exerted by the port MAC module 100, as determined in step S3, the present embodiment proceeds to reset the retry counter to 0 in step S5. Thus, under the CSMA/CD protocol, the port MAC module 100 is given a higher probability of winning collision mediation over the media 17 for the data packet awaiting transmission in transmit portion 70c. This is advantageous since faster transmission of the data packet from the port will help alleviate the congestion in the network switch 12, which gave rise to the need for the assertion of backpressure. In other words, if backpressure is needed, the network switch 12 is most likely in a congested state and measures taken to alleviate any sources of congestion (e.g., resetting a retry counter to aid in rapid transmission of a data packet awaiting retransmission) are desirable.

While this invention has been describing what is presently considered to be the most practical preferred embodiments, it is to be understood that the invention is not limited to the disclosed embodiments, but, on the contrary, is intended to cover various modifications and equivalent arrangements included within the spirit and scope of the appended claims.

What is claimed is:

1. A network switch connected in a computer network, comprising:

a plurality of ports configured for transferring data packets over the computer network;

each respective port of the plurality of ports having a retry counter incrementing a count of a number of times the respective port attempts and fails to transfer a data packet from the respective port over the computer network; and a retry counter reset for resetting the count of the retry counter to a start value in response to assertion of backpressure by the respective port onto the computer network.

2. The network switch according to claim 1, wherein each respective port further comprises a control logic that detects the assertion of backpressure by the respective port and monitors a current value of the count in the retry counter.

3. The network switch according to claim 2, wherein the count has a maximum number corresponding to a maximum number of times that the port is allowed to attempt to transfer the data packet.

4. The network switch according to claim 3, wherein the control logic discards the data packet and causes the retry counter to reset the count to the start value when the count reaches the maximum number.

5. The network switch according to claim 3, wherein the maximum number is 16.

6. The network switch according to claim 1, wherein the start value is zero.

7. The network switch according to claim 1, wherein the backpressure data sequence includes a bit sequence transmitted over the computer network.

8. A method for controlling a port of a network switch in a computer network comprising:

incrementing a count in a retry counter within the port each time the port attempts and fails to transfer a data packet over the computer network;

sensing whether backpressure is asserted by the port over the computer network; and resetting the count in the retry counter to a start value based upon assertion of backpressure by the port onto the computer network.

9. A method according to claim 8, wherein the count has a maximal value for attempts to transfer the data packet; and further comprising discarding the data packet and resetting the count in the retry counter to the start value when the count reaches the maximal value.

10. A method according to claim 8, wherein backpressure is asserted based upon the port being forwarded data packets at a rate exceeding a port rate at which the port is capable of transmitting the forwarded data packets.

11. A method according to claim 8, wherein the start value is zero.

12. A method according to claim 9, wherein the maximal value is 16.

13. A method according to claim 8, wherein exerting backpressure includes transmitting a sequence of bits on the computer network.

14. A media access controller (MAC) arrangement comprising:
- a retry counter that maintains a count of the number of attempts at transmission of data by the MAC onto a computer network;
- control logic that monitors assertion of backpressure by the MAC; and
- a retry counter reset signal generator responsive to assertion of the backpressure to generate a retry counter reset signal that resets the count to a start value.

15. The arrangement according to claim 14, wherein the count has a maximum value corresponding to a maximum number of times that the MAC is allowed to attempt transmission of the data.

16. The arrangement according to claim 15, wherein the MAC discards the data when the count reaches the maximum value.

17. The arrangement according to claim 15, wherein the retry counter reset signal generator generates a retry counter reset signal to reset the count to the start value when the count reaches the maximum value.

18. The arrangement according to claim 14, wherein the retry counter reset signal generator generates a retry counter reset signal to reset the retry counter to the start value upon each occurrence of the assertion of backpressure by the MAC.

19. The arrangement according to claim 14, wherein the start value is zero.

20. The arrangement according to claim 15, wherein the maximum value is 16.

* * * * *